United States Patent
Rosenan et al.

(10) Patent No.: US 8,271,790 B2
(45) Date of Patent: Sep. 18, 2012

(54) METHOD AND SYSTEM FOR SECURELY IDENTIFYING COMPUTER STORAGE DEVICES

(75) Inventors: Avner Rosenan, Yehud (IL); Zvi Gutterman, Jerusalem (IL); Hay Hazama, Kiriat Ono (IL); Orli Gan, Tel Aviv (IL)

(73) Assignee: Safend Ltd., Tel Aviv (IL)

( * ) Notice: Subject to any disclaimer, the term of this patent is extended or adjusted under 35 U.S.C. 154(b) by 809 days.

(21) Appl. No.: 11/794,577

(22) PCT Filed: Dec. 21, 2005

(86) PCT No.: PCT/IL2005/001367
§ 371 (c)(1), (2), (4) Date: Dec. 3, 2009

(87) PCT Pub. No.: WO2006/070353
PCT Pub. Date: Jul. 6, 2006

(65) Prior Publication Data
US 2010/0071030 A1 Mar. 18, 2010

Related U.S. Application Data

(60) Provisional application No. 60/640,824, filed on Dec. 30, 2004.

(51) Int. Cl.
*H04L 9/32* (2006.01)
(52) U.S. Cl. ........ 713/176; 713/178; 713/173; 713/180; 713/156; 713/155; 726/2; 726/10
(58) Field of Classification Search ........................ 726/2
See application file for complete search history.

(56) References Cited

U.S. PATENT DOCUMENTS

| | | |
|---|---|---|
| 2002/0165912 A1 | 11/2002 | Wenocur et al. |
| 2005/0136949 A1* | 6/2005 | Barnes, Jr. .................... 455/461 |
| 2005/0228886 A1 | 10/2005 | Cain et al. |
| 2005/0232242 A1 | 10/2005 | Karaoguz et al. |
| 2005/0239445 A1 | 10/2005 | Karaoguz et al. |
| 2005/0246778 A1 | 11/2005 | Usov et al. |
| 2006/0023675 A1 | 2/2006 | Karaoguz et al. |
| 2006/0200681 A1* | 9/2006 | Kato et al. .................... 713/193 |

FOREIGN PATENT DOCUMENTS
WO WO 94/03859 A1 2/1994

OTHER PUBLICATIONS

Extended European Search Report dated Jan. 11, 2011, of European Application No. 05817902.9.
International Search Report for International Application No. PCT/IL05/01367 mailed Jan. 26, 2007.

* cited by examiner

*Primary Examiner* — Nathan Flynn
*Assistant Examiner* — Bryan Wright
(74) *Attorney, Agent, or Firm* — Pearl Cohen Zedek Latzer, LLP (57) ABSTRACT

In a private network setting in which various computers can be attached, the confidential or sensitive data within the various devices on the private network is vulnerable. The ability to copy such confidential or sensitive data to a storage device communicatively coupled to a client computer on the network is governed and controlled. Only devices that include an authentic stamp or digital certificate can be accessed by client computers. If a device does not have a valid stamp or the stamp has been black listed, then the access to the device can be prevented or greatly limited.

31 Claims, 7 Drawing Sheets

METHOD AND SYSTEM FOR SECURELY IDENTIFYING COMPUTER STORAGE DEVICES

CROSS-REFERENCE TO RELATED APPLICATIONS

This application is a National Phase Application of PCT International Application No. PCT/IL2005/001367, entitled "METHOD AND SYSTEM FOR SECURELY IDENTIFYING COMPUTER STORAGE DEVICES", International Filing Date Dec. 21, 2005, published on Jul. 6, 2006 as International Publication No. WO 2006/070353, which in turn claims priority from U.S. Provisional Patent Application No. 60/640,824, filed Dec. 30, 2004, both of which are incorporated herein by reference in their entirety.

BACKGROUND OF THE INVENTION

The present invention relates to the field of private network security and, more particularly, to protecting private networks from leakage or extraction of information or insertion of unapproved material both when the clients are connected to the private network and when they are not connected (i.e., working online or offline).

Commercial corporations, enterprises, organizations, such as government bodies, health care providers, military organizations, financial institutes, etc., face several computer security concerns. One of these concerns is the leakage of information from their internal computer network to the outside world. The threat of information leakage may come from outsiders attempting to hack into the organization's computer system as well as from disloyal, disgruntled or simply careless employees working inside the organization.

Internal employees, utilizing the permissions that have been granted to them, may gain access to the enterprise's information stored on the organization's computer system, download the information to their client computer and then transfer the information to an external storage device. The external storage device may be a removable storage device (e.g. flash memory, such as but not limited to, DISCONKEY provided by M-SYSTEMS or a other removable hard disk drives), a removable storage media (e.g., floppy disk, write able CD ROM or external hard drives), an internal hard drive (e.g., IDE hard drive or SCSI hard drive), a PDA with storage, a digital camera with storage, etc.

One common approach to deal with this type of security threat is by preventing access to all external storage devices from the computer system. This can be accomplished by blocking all the ports on which such external storage devices can appear on, or blocking the mount operation of a storage device. However, such drastic approaches adversely affect the productivity of the computer system users in that they prevent the employees from using any removable media.

Therefore, there is a need in the art for new method that can limit the ability for an employee to copy confidential information to an external device by providing a technique of selectively choosing the storage devices that can be used in the corporation's computing devices. This method can be accomplished by applying general rules based on the various parameters of the device, such as but not limited to the bus type of the device (e.g., SCSI, USB, IDE, Firewire, etc. . . . ), the disk or memory size, the vendor providing the device, geometry, as well as other parameters. One approach dealt with in the current invention is identifying a unique device and letting it connect to the corporation's computing devices based on a digital certificate, which was given on that unique storage device.

Once a unique storage device is securely identified, it can then be controlled according to a given policy. The policy may be selected according to parameters gathered from the storage device and can be operationally enforced by setting up procedural rules for employees, may be computer enforced, or may be a combination. Exemplary embodiments of the present invention may be used on a storage device that is given to personnel in the Public Relation (PR) department of an organization. The PR personal may be allowed to use the storage device only within that department. An employee from a different department should not be able to see the content of this device nor to be able to change it.

BRIEF SUMMARY OF EXEMPLARY EMBODIMENTS

Exemplary embodiments of the present invention meet the above-described needs in the art by providing a technique for uniquely identifying a storage device so that a security policy can be enforced in a way that only allowed storage devices may be used in the corporation's computing devices. One aspect of exemplary embodiments of the present invention is to identify a storage device by utilizing a digital certificate.

An exemplary embodiment of the present invention may include a Security Manager Module and a plurality of client agents operating on a private network or sub-network. The Security Manager Module (SMM) can reside on a security server in the private network and can manage or enforce a security policy. The SMM is typically controlled, configured and operated by a system administrator. A client agent, which may be a software module and/or a hardware device, is installed in each one of the computing devices to be connected to the private network. The existence of the client agent can be a mandatory condition for enabling the connection to the private network. In such an embodiment, the private network may not respond to, communicate with, or grant access to a computer that does not include a client agent.

The client agent operates to detect newly connected storage devices and if possible, to gather one or more parameters from the storage device. By cross-correlating this information with a stored policy controlled or enforced by the SMM, the client agent decides what should be done with the storage device. Exemplary parameters that may be gathered by the client agent include, but not limited to, the number of cylinders, the tracks per cylinder, a serial number if one exists, as well as other physical or configuration information about the storage device. In some embodiments, this information may be considered a digital certificate that is unique to a particular type of storage device and/or a particular storage device. An exemplary client agent, based on the policy and the unique digital certificate, may control the operations related to the storage device. For instance, the client agent may block access to the storage device; enable access to the storage device; disable all writing operations to the storage device, logging that this specific storage device was introduced to the client agent, etc.

Another aspect of exemplary embodiments of present invention is stamping module (SM). The SM is typically deployed within a security server implementing an exemplary embodiment of the present invention. The SM is basically a user interface module that is used by an administrator. In operation, the SM detects a storage device that has been connected to the administrator's computer or the security server and, if possible, gathers one or more parameters from the storage device. In addition, the SM may query the administrator for a security ascription (such as, but not limited to a department name) for the device. The SM then "stamps" the device by writing or storing within the storage device, a digital certificate signing the security ascription (classification), device parameters and more security parameters.

Another aspect of exemplary embodiments of the present invention is the creation and utilization of the digital certificate. In one embodiment of this aspect of the present invention, the digital certificate can be created in a Central Signing Module (CSM) that is dedicated to a particular device or device type. A unique private key (PrK) that is associated with the security server and known only to the security server is utilized by the security server during the creation of a digital certificate. The PrK remains only in one security server; however in practice, it might be beneficial to back it up in a media that exists outside the network but remains secure. The PrK may be generated randomly during the installation of the security server or may be generated by another source and simply provided to the security server. The PrK is used by the security server during the creation of a digital certificate for each one of the external devices.

Moreover, exemplary embodiments of the present invention may include a Log Module (LM) that is integral to the client agent and a Log Server Module (LS), which is an integral part of the security server. The LS may be used to store, and manage the logs that are collected and stored. The central location may include a Log Analyzer (LA), which analyzes each one of the logs to find suspicious activities. The log feature implements or ensures the security of the "stamp" by coordinating between all the client agents. Thus, the log feature ensures that every "stamp" is used only by one unique device.

Other objects, features, aspects and advantages of the present invention will become apparent upon reading the following detailed description of the embodiments with the accompanying drawings and appended claims.

DETAILED DESCRIPTION OF EXEMPLARY EMBODIMENTS

Turning now to the figures in which like numerals represent like elements throughout the several views, various aspects and exemplary embodiments of the present invention are described. For convenience, only some elements of the same group may be labeled with numerals. The purpose of the drawings is to describe exemplary embodiments of the present invention and not for production or limitation. Therefore, features shown in the figures are chosen for convenience and clarity of presentation only.

Figure 1:
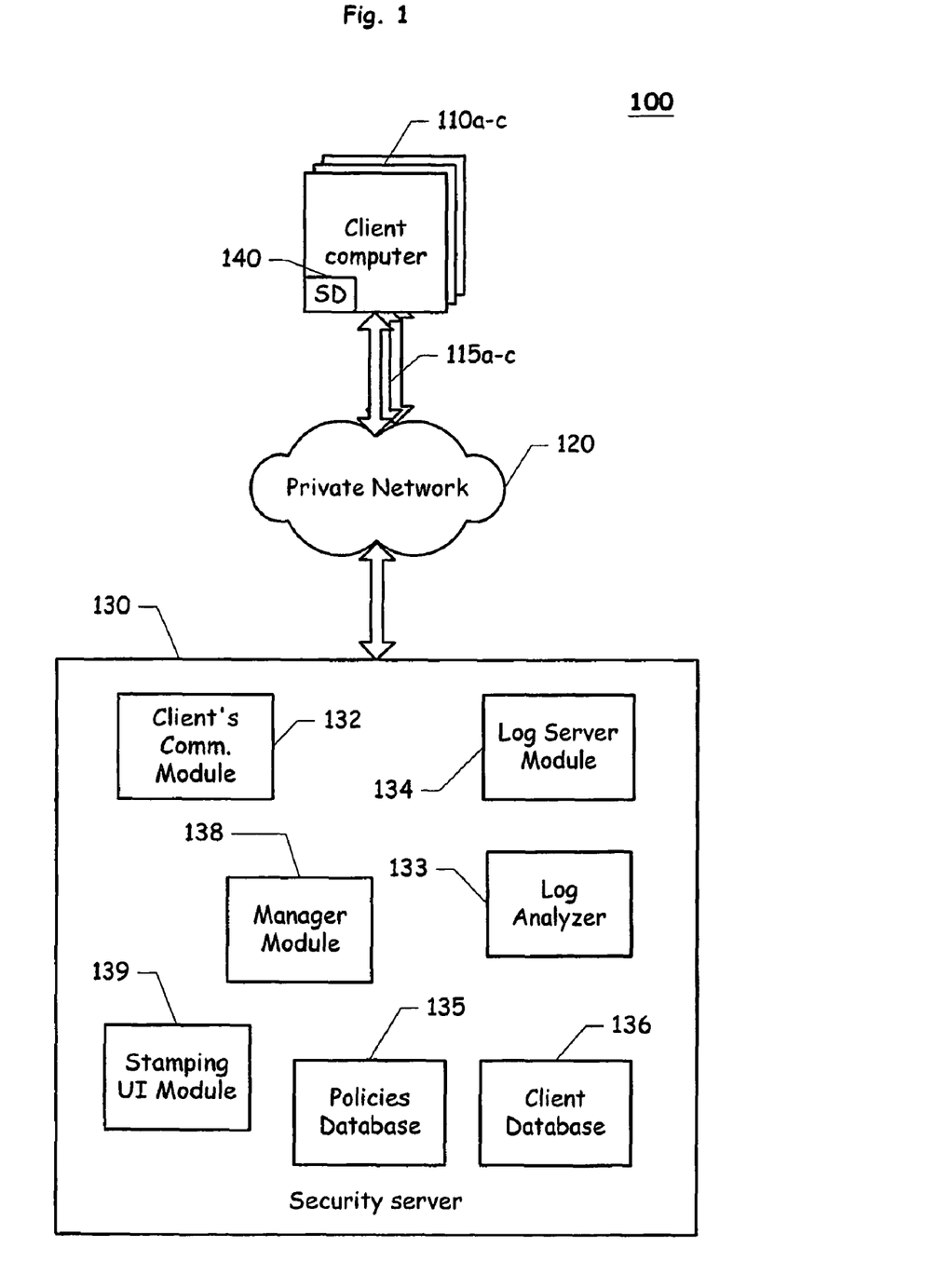
FIG. 1 is a block diagram depicting relevant elements of a computer system 100 that uses an exemplary embodiment of the present invention for protecting the computer system from client systems that are communicatively coupled to the computer system.

FIG. 1 is a block diagram depicting relevant elements of a computer system 100 that uses an exemplary embodiment of the present invention for protecting the computer system from client systems that are communicatively coupled to the computer system. The computer system 100 may consist of a plurality of client computers 110a-c, a private or public network 120, a plurality of communication channels 115a-c between the private network 120 and the plurality of client computers 110a-c, and a security server 130. One or more of the client computers 110a-c may be connected to one or more storage devices 140, or to one or more devices with a storage device (e.g. a PDA with a storage device). Three instances of client computers 110a-c and communication channels 115a-c are shown in FIG. 1 by way of example only, and it will be appreciated that any number other than three may also be used with various embodiments of the present invention. The private network 120 may be an Intranet, cellular network, a LAN, a VPN (Virtual Private Network) or any other type of communication network.

Exemplary embodiments of the present invention can be implemented in a public network as well as in a private network. However, in same embodiments of the present invention the connection to the private network of a computer having a forged client agent can be prevented.

Each of the client computers 110a-c may be a personal computer, a workstation, a desktop computer, mainframe computer, blade server (e.g. CITRIX), dumb terminal, etc. or any other type of computing device that can be connected over the private network 120. Each of the client computers 110a-c may also be a portable device, such as but not limited to a laptop computer, notebook computer, a smart phone, a personal digital assistant (PDA), or any other type of mobile device.

From time to time, the client computer 110a-c may be connected to various networks, at home, at work, and at other locations. Communication channels 115a-c may be permanent connections, temporary connections, and wire or wireless connections. A wireless connection can be an RF connection based on a protocol such as, but not limited to, Bluetooth or WiFi. The wireless connection may also be an Infra Red (IR) connection. More information about the client computers 110a-c is disclosed below in conjunction with FIGS. 2, 3, 5a and 5b.

The security server 130 may be an element of network 120. The security server 130 may be responsible for managing the security policies that are used over the private network 120 as well as initiating and managing the writing and checking of a digital certificate. A plurality of policies may be used by each client computer 110a-c. The security policies may be based on the client's degree of security, the type of the devices that are connected to the client computer, etc. The security policies can be updated from time to time and then be loaded or reloaded into the clients.

The security server 130 can operate to ensure that all client computers comply with specified security policies. For example, if a trigger event occurs and a copy of a corporate security policy is not available on a client computer 110a-c, the client computer 110a-c may initiate a connection to the security server 130. In response to such initiation, the appropriate policies may be downloaded to the client computer 110a-c. The security server 130 may periodically update the security policies that are installed in each one of the client computers 110a-c. A security agent may be installed within the client computer 110a-c. The security agent, among other things, operates to enforce the security policy by monitoring events in accordance with the security policy.

The security server 130 can be constructed in a variety of manners. One exemplary embodiment of the present invention may comprise the following relevant modules: client's communication module 132, log analyzer module 133, log server module 134, policies database 135, client database 136, stamping user interface module 139 and a manager module 138. Client communication module 132 is typically used to communicate with the plurality of client computers 110a-c over the private network 120 while the client computers 110a-c are connected to the private network 120. The communication between the client computers 110a-c and the security server 130 can be encrypted to create a secure connection between the client computers 110a-c and the security server 130, over which data can be sent securely.

The communication from the security server 130 to the client computer 110 may include providing updated security policies and/or periodically checking the security agent and the security policies that have been installed on the client computer 110 to determine if they have been contaminated or have been tampered with by any hostile code. If a particular client computer 110 does not have a required client security agent or security policy installed, or the security agent was infected, the security server 130 can prevent further access to the private network until such client computer 110 has installed and activated the required security agent or security policy. Technologies like network access control (NAC) of Cisco, Network Access Protection (NAP) of Microsoft, or changing routing tables can be used in order to prevent connection of an infected security agent to network 120.

The communication from the client computer 110 to the security server 130 may include: (a) a real-time indication that is used to inform the security server 130 when the client computer 110 is connected to the private network 120, (b) reports on events according to the security policy, (c) reports on trials to affect the security agent or the stored security policy, etc. The report may include information on any connection of the client computer 110 to an external device, information on the data transfer, the timing of the event, the location, the device to which the data transfer was done, shadowing of the information that was transferred while the client computer 110a-c was not connected or connected to network 120, etc.

The log server module 134 may be or may include a storage device. Any reports that have been sent from the client computers within a certain period of time and/or pertaining to any policy violation event can be received by the log server module 134 and stored within the storage device. In addition, the log server module 134 keeps track of the "stamped" devices (devices with digital certificate) used in all client computers 110a-c. The reports may be retrieved and processed manually by an administrator of the private network 120 or automatically by the log analyzer module 133, which may run several statistical algorithms in order to monitor the security of the network. The process may uncover a careless user that may have connected or attempted to connect certain devices to the client computer 110 or identify an attempt to access such certain storage devices. The report may also identify a negative trend. As one example of a negative trend, the report may identify multiple client computers in which the security agent has been tampered with, modified, etc. When a portable client is not connected to the network 120, the events may be kept by the client agent operating within the client computer and then sent to the security server 130 when the client computer is reconnected to the private network 120.

The Log Analyzer Module (LA) 133 is the module doing all of the arithmetic operations required to coordinate between all the agents and all of the secured devices. As stated earlier, it has a central role in the "stamping" algorithm discussed below.

Policies database 135 may include a database of a plurality of policies, including security policies that may be used by the organization that uses the private network 120. A security policy may include a set of rules that are used to determine whether a given client computer can be permitted to gain access to a specific storage device. The security policy may depend on a variety of factors, such as but not limited to, the size of the storage device, the manufacturer of the storage device, whether the device is "stamped", "stamp" security ascriptions, etc. In addition, different security policies may be allocated to different users, groups of users, computers working hours, etc.

Client database 136 is a database that may include information regarding the various client computers 110a-c that may be connected over private network 120. This information may include items such as but not limited to: the client level of security, the type of equipment that the client possess, the external devices to which the client computer is allowed to be connected, information about the different environments in which the client computer may work, etc.

The manager module (MM) 138 manages the operation of the security server 130. It may initiate tasks to check the status and configuration of the security agent and the security policies installed within the various client computers. The MM 138 may create and send the appropriate policies to each one of the client computers. Based on the information that is stored in the policies database 135 and the client database 136, the MM 138 may create one or more policies for a particular client. For example, a client that has a portable computer may need three policies. One of the policies may be used while the particular client computer is connected to the private network 120. Another of the policies may be used when the client computer is operating in a known environment, such as but not limited to a home environment or home network. The third policy may be used when the client computer is operating in an unknown environment or location. One example of such an unknown environment would include a hotspot or a WiFi access zone.

The MM 138 and the stamping UI module 139 cooperatively are responsible for signing the "stamp" on each one of the relevant storage devices 140. An exemplary method for signing the "stamp" or a digital certificate may be based on a certification standard, including but not limited to ITU.T standard X.509. Signing may be done by using cryptographic techniques such as but not limited to MD5, SHA-1 for calculating a hash value and RSA for encryption and decryption. In an exemplary embodiment of the present invention, the security server has a cryptographic private key, while each of the clients have a public key. Signing the "stamp" may be done by using an exemplary method as it is described below in conjunction with FIG. 4. The ITU is the United Nations Specialized Agency in the field of telecommunications. The ITU Telecommunication Standardization Sector (ITU-T) is a permanent organ within the ITU. The ITU-T is responsible for studying technical, operating and tariff questions and issuing recommendations on them with a view to standardizing telecommunications on a worldwide basis. Additional information regarding the ITU can be found at the website address of www.itu.int.

The stamping user interface module (SUIM) 139 may have a graphical user interface (GUI) that may be used by the administrator of the system to "stamp" storage devices. In an alternate exemplary embodiment of the present invention SUIM 139 may be distributed over one or more computers that are used by one or more administrators for interfacing with the security server. The SUIM 139 may gather parameters from the storage device, and allow the administrator to choose a security ascription to which the storage device will be associated. The parameters and the ascription are used in the process of creating the new stamp. This information is transferred to the MM 138. The MM 138 may retrieve the parameters and the ascription of the "stamp" to be written on the storage device. The "stamp" is processed and then written onto the storage device. More information on the stamping process is described below in conjunction with FIG. 4.

Figure 2:
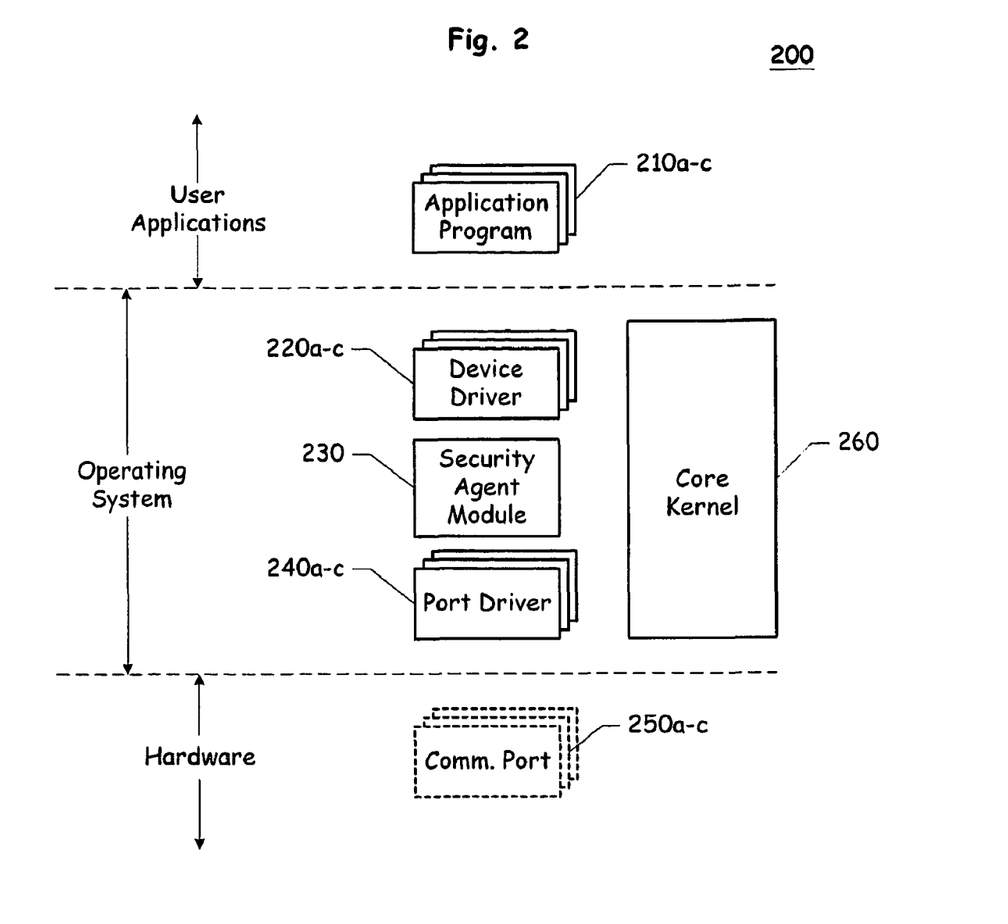
FIG. 2 is a block diagram depicting relevant elements of a client system 200 that may be used in an exemplary client computer 110a-c (FIG. 1).

FIG. 2 is a block diagram depicting relevant elements of a client system 200 that may be used in an exemplary client computer 110*a-c* (FIG. 1). The client system 200 may comprise one or more application programs 210*a-c*, one or more device drivers 220*a-c*, a security agent module 230, one or more physical communication port or bus drivers (stack) 240*a-c*, a core kernel module 260 and one or more physical communication ports or buses 250*a-c*. Generally, the data transportation between a client computer and a device flows from/to an application 210*a-c* to/from a physical communication port 250*a-c* via the appropriate device driver 220*a-c*, security agent 230 and the appropriate port driver 240*a-c*.

The example illustrated in FIG. 2 shows the use of three application programs 210*a-c*, three device drivers 220*a-c*, three port drivers 240*a-c* and three physical communication ports 250*a-c*; however, it will be appreciated that any number other than three may be used with the present invention. The client system 200, or aspects of the client system 200, may be stored in a fixed storage medium (e.g. a disc, flash memory, a read-only memory (ROM) etc.).

The core kernel 260, the device drivers 220*a-c* and the port/buses drivers 240*a-c* may jointly be referred to as the operating system (OS) of the client computer 110*a-c* (FIG. 1). The OS may manage low-level aspects of computer operation, including managing the execution of processes, memory allocation, file input and output (I/O) and device I/O. An exemplary OS that can be utilized within various embodiments of the present invention may include windows NT or XP, Unix, MAC OS, MVS; LINUX, SYMBIAN, PALM-OS, etc.

One or more application programs 210*a-c* may be transferred from a fixed storage medium into a RAM (not shown) of client 200 for execution by the client system 200. The application programs 210*a-c* may be a program such as, but not limited to, (a) synchronization applications for a PDA, (b) Java applications for synchronization with external Java devices, such as but not limited to cellular telephones, backup storage applications, (c) office applications, including but not limited to word processing applications, presentation applications, file utilities, etc., and (d) communication applications, such as but not limited to, applications that utilize Bluetooth or WiFi protocols, Internet browser, etc.

When the core kernel 260 and/or one or more application programs 210*a-c* operate to communicate with an external storage device, the appropriate device driver 220*a-c* may be invoked. The device driver 220*a-c* is used as an intermediary between the core kernel 260 and/or one or more application programs 210*a-c* and the external device itself. Exemplary external devices can include: a removable storage device, a printer, a PDA, a WiFi dongle, etc. An exemplary embodiment of the present invention may also be configured to operate to protect the access of the internal permanent storage of the client computer, such as the internal hard disc, disc 'C:'. It should be noted that in this application, the words "external storage", "external device", "external device with storage device" and "internal permanent storage of the client computer (hard disc)" may be used interchangeably.

Usually a device driver 220*a-c* is supplied by the vendor of the device itself. In addition to the device driver 220*a-c*, a port driver 240*a-c* may also be invoked. The port driver/bus driver 240*a-c* is used to organize the communication according to the protocol that is used over the physical communication port 250*a-c*. For example, if communication port 250 is a USB port, then a USB driver (USB stack) is needed. The above-described computer software is for illustrating the basic desktop or server computer components that may be employed by a client computer 110*a-c* (FIG. 1). In addition to those elements, a security agent 230 is added by an exemplary embodiment of the present invention.

The security agent 230 may be installed in the standard storage (not shown) of the client system 200 and it may be invoked during the power on cycle of the client computer 110*a-c* and remain active for the entire operation of the system 200. In other embodiments of the present invention, the security agent 230 may be burned onto a physical memory, such as the ROM, PROM, BIOS, etc. The security agent 230 may be installed as a section of the OS and can be handled by an administrator having the appropriate permissions. The security agent 230 may be installed above the one or more communication port/bus drivers 240*a-c*.

An exemplary security agent 230 may emulate a kernel device driver and will receive the communication between the device driver 220*a-c* and the appropriate port driver 240*a-c*. During the installation and/or periodically, from time to time, the security agent 230 may register in the appropriate location in the core kernel as the first device driver for receiving the communication from/to the different physical communication port/bus drivers. For example, if the OS is a Microsoft product, than the security agent 230 may register in the Registry as the first device driver to get the communication. The registration may be done in a class level or in a device level. Exemplary classes may be USB, CD-ROM drivers, Disk Controller, etc.

In some operating systems, the device driver may be constructed from a stack of two or more sub-device-drivers. In such an architecture, an exemplary embodiment of the security agent 230 may operate to collect information from at least one of the two or more sub-device-drivers. For example, in the scenario of using a USB flash storage device, such as but not limited to, DISKONKEY (DiskOnKey is a trademark of M Systems) in the WINDOWS (Windows is a trademark of Microsoft) environment, the stack of the relevant sub-device-drivers can include: VolSnap.sys; Disk.sys; UsbStor.sys; and Usbhub.sys. The security agent may collect information from any of the four sub-device-drivers.

In an exemplary embodiment of the present invention, the security agent 230 may emulate a filter procedure but, instead of providing the functionality of a common storage filter driver, the security agent performs security checking. A filter may perform device-specific functionality that is not provided by a class device driver. The security agent 230 may emulate more than one type of filter driver. The number of types of filters that may be emulated by the security agent 230 can be configured according to the number of physical communication ports and devices of which their transportation may be checked by the security agent 230.

Security agent 230 may be activated when a physical communication port is requested. The security agent 230 may pull the transportation to and from the physical communication port, processes the information and may reach a decision regarding the legality of the requested connection and/or data transfer. An exemplary embodiment of the security agent 230 may act as a proxy for both sides. The security agent 230 may be transparent to the user; it may not have any icon or indication to indicate its existence to the user. More information about the operation of security agent 230 is disclosed below in conjunction with the description of FIGS. 3, 4 & 5a & b.

Figure 3:
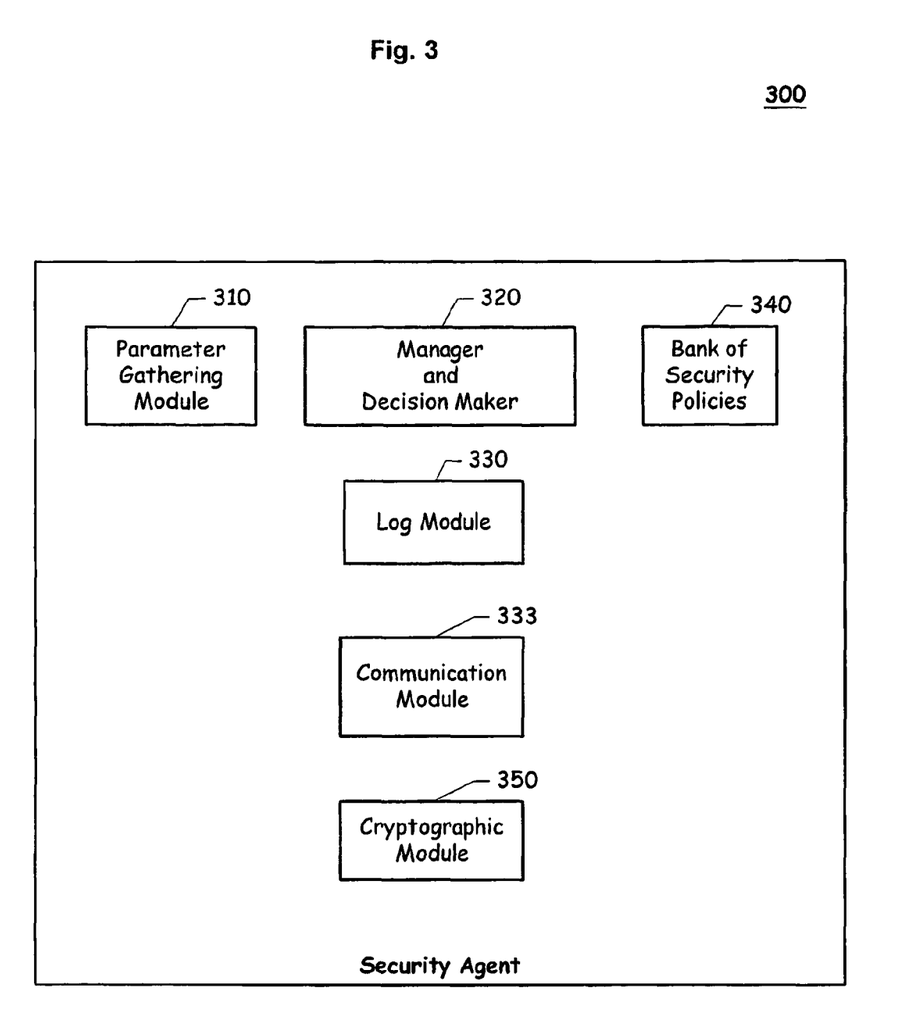
FIG. 3 is a block diagram illustrating components of the client security agent according to an exemplary embodiment of the present invention.

FIG. 3 is a block diagram depicting relevant elements of an exemplary security agent module 300 that may be used by an exemplary security agent 230 (FIG. 2). Security agent module 300 may comprise a parameter gathering module (PGM) 310, a manager and decision maker 320, a log module (LM) 330, a communication module 333, a bank of security policies (BOSP) 340 and a cryptographic module (CM) 350.

The PGM 310 detects a newly connected device, such as a client computer 110 having a storage device 140, and may extract some parameters from the storage device 140 (FIG. 1). The parameters can include information that is relevant to the device. For example if the device is a disc, the parameters may include, for example: the disk's size, its geometry parameters (such as number of cylinders, tracks per cylinder, etc.), a serial number if one exists, etc. Those parameters can be used during the process of creating and writing the stamp, as well as for verifying stamps. Moreover, the parameters may be used in order to check whether the connection to the device is allowed. For example, if allowing the device depends on its volume of storage, the device may not be allowed unless it falls within the threshold requirements.

There are cases in which parameters of the storage device are not accessible to the security server. In those storage devices, exemplary embodiments of the present invention may use only the information that was written by the security server onto the external storage device. Such information written by the security server is further disclosed below in conjunction with FIG. 4.

Another role of the PGM 310 is to retrieve the content of the "stamps" from the storage device. These stamps are examined with the algorithm described below in conjunction with the description of the cryptographic module 350. During this examination, the "stamp" is revealed and checked for authenticity. The parameters of the stamp, which can include the stamp name and ID, are then moved to the manager and decision maker 320. The manager and decision maker 320 then operates to check the applicable policy according to all of the information given by or pertaining to the storage device, such as but not limited to, a USB vendor id, product id, disk size, stamp name (security ascription), stamp ID as well as other parameters and values.

The cryptographic module (CM) 350 may be invoked by the MDM 320 upon connecting client system 200 (FIG. 2) to a device that includes storage capabilities. The cryptographic module 350 may get, via the PGM 310, the parameters of the device as well as the current "stamp" that is written on or associated with the device. The CM 350 may verify the validity of the stamp and then update the MDM 320 with the result of the verification. In addition, the CM 350 may update the "stamp". The updated "stamp" is written back to the device replacing the previous stamp. More information on the operation of the CM 350 is disclosed below in conjunction with the description of FIGS. 5a and 5b.

The log module 330 may be a storage area for storing communication events and/or any policy violation event. In addition to that, the log module 330 keeps track of the "stamped" devices (devices with digital certificates) used in or connected to the client computer 110. When the client computer 110 is connected to the network 120, the logged events may be sent to the security server 130 (FIG. 1).

The communication module 333 operates to deliver logs from the client computer 110 to the security server 130, and one or more policies from the security server 130 to the client computer 110. This communication is preferably secured and includes authentication, so that it will be difficult for a system to mimic a policy.

The BOSP 340 manages one or more security policies that are installed from time to time by the administrator of the private network 120 (FIG. 1), while the client computer 110 is connected over the private network 120. Moreover, the policy may be dependent upon the time of operation, the type of network, capabilities and types of external storage devices, the number of external devices, etc.

Each security policy may comprise a plurality of rules that may operate to control the behavior or availability of a storage device based on various parameters. The parameters may include, but are not limited to, the device's parameters, hardware parameters, the stamp name and the stamp ID. The rules within the security policy can be positive (i.e. allowances) or negative (i.e. restrictions). An exemplary rule that could exist in a security policy is as follows:

a storage device that is stamped with a stamp name="PR", can be used accessed by a client computer named PR1 only if the stamp ID of the storage device is not one of the following ID numbers (1563 or 2317).

From time to time, the content of the BOSP 340 may be checked and updated manually by the administrator of network 120 or automatically by the security server 130 (FIG. 1). From time to time, the MDM 320 may perform an integrity check on the BOSP 340 to determine if it has been tampered with or modified by hostile code. If the BOSP 340 has been damaged or otherwise altered, the MDM 320 may prevent any data transportation to/from any external device.

Figure 4:
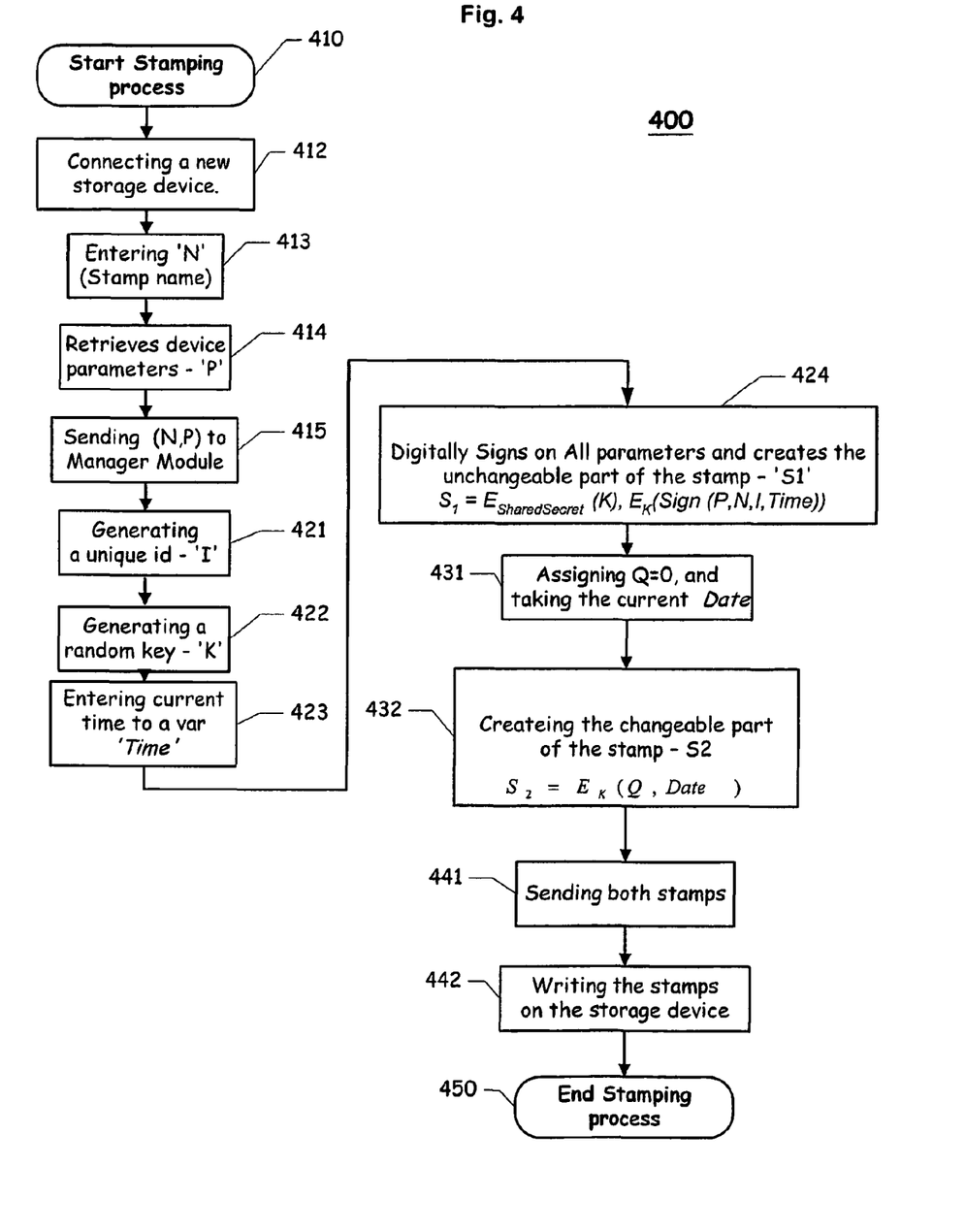
FIG. 4 illustrates a flowchart with relevant steps of an exemplary method for signing on a specific storage device.

FIG. 4 illustrates a flowchart depicting relevant steps of an exemplary method 400. The method 400 may be used by the MM 138 and the stamping UI module 139 to stamp a particular storage device. The method 400 may be initiated 410 when the stamping UI module 139 opens a session with the MM 138. In an exemplary embodiment of the present invention, in which the stamping process is done via the administrator's computer, the open session can be encrypted and authenticated. In such an embodiment (not shown in the drawings) the SUIM locates in another entity (the administrator's computer) while the MM 138 (FIG. 1) locates in the security server 130. This authentication can be done by any known method, for example, if both the MM 138 and the Stamping UI module 139 are MICROSOFT WINDOWS workstations working in a domain, the authentication may be done by using Kerberos. Kerberos is an Internet Engineering Task Force (IETF) standard for providing authentication. Kerberos works by having a central server grant a "ticket" honored by all networked nodes running Kerberos.

At step 412, an administrator of the system 100 (FIG. 1) may connect an external device, which may include a storage device, to the computer that is used by the administrator (e.g. this could be the security server 130). At step 413, a name N that represents the security ascription of the stamp is entered. N may represent various information, such as the department of the user, the security level of the user, etc. If they are accessible, the stamping UI module 139 may retrieve one or more parameters P from the storage device 140 at step 414. These parameters can include parameters such as, but not limited to, bus type (e.g., IDE, SCSI, USB and FireWire), bus's parameters (like vendor id, product id and serial number in USB bus), disk geometry (number of cylinders, tracks per cylinder, sectors per track, bytes per sector and disk size), file system parameters, etc.

At step 415, the stamping UI module 139 may send the gathered parameters P and the name N to the MM 138. The parameters P have been gathered from the user, and administrator, randomly generated and/or automatically from the storage device 140.

A unique ID I for the stamp (step 421) may then be generated by MM 138 (FIG. 1). The unique ID can be a next sequential number that is generated by an accumulator that is increased by one in any stamp, or can be generated using any of a variety of techniques to prevent reuse of the ID either perpetually or for a period of time that substantially has the effect of perpetual non-reuse. For instance, system 100 may have only one ID generator. In an alternate embodiment of the present invention, the ID generator may include a pseudo random machine that generates a random number and a table of all ID numbers that are in use. The ID number can be a next new output of the pseudo random machine.

At step 422, the MM 138 may generate a symmetric key K that is used in the stamp. This symmetric key K is completely random and thus, will most probably be unique to each stamp. Additionally, a variable Time is updated at step 423 to contain the current time.

At step 424 an unchangeable part of the stamp is created S1 using the following equation:

$$S1 = E_{SharedSecret}(K), E_K(\text{Sign}(P,N,I,\text{Time})).$$

Thus, S1 consists of two components. One component is a hashed or otherwise manipulated value based on the P, N, I, and Time parameters, which is then encrypted using the symmetric key K. The other component is an encryption of the symmetric key K using a shared secret key such as is common in public encryption schemes such as RSA and others.

In an alternate exemplary embodiment of the present invention a shared secret or a symmetric key or time stamp may not be used. Then S1 can be calculated by the following formula S1=Sign (P,N,I).

The MM 138 uses its private key (which must remain private for the security of this algorithm) to sign all the above-defined data values (P, N, I, and Time). Thus, the exemplary data may include: the device's parameters P, the stamp name N, the stamp ID I, and the current time Time. The parameters N, I, and Time must be readable by the security agent module 230. The security agent module 230 is adapted to read the stamp. P can be omitted in the signature because the parameters of the storage device can be retrieved by the PGM 310 (in the security agent, FIG. 3) during the sampling verification process directly by accessing the storage device.

At the security agent 230, the readable parameters can be checked for authenticity. An exemplary unchangeable signature S1 may have the following information: N, I, Time+ Encrypt_using_PrK(Hash(P,N,I,Time), PrK represents the private key. Exemplary Hash function can be MD5, or SHA-1, for example. The last phrase is the signature that the device was stamped with by the MM 138. These arguments are encrypted using a session key K, which is itself encrypted with a predefined symmetric key known to all clients CM 350 and to the MM 138. The stamp is calculated in step 424 in FIG. 4.

In steps 431-432 a changeable stamp S2 is created. The changeable stamp may be changed each time that the stamped device is used in, or connected to, a protected computer, having a security agent module 230 (FIG. 2). S2 may include a sequence number and a date. In some exemplary embodiments of the present invention the term 'date' may include information on the exact time, date as well as the hour, minutes etc. To overcome synchronization problems between different clocks, the security server clock may be used as a reference and may be registered at the different clients, when the clients are connected to the network. The sequence number and the dates are used to ensure that a stamp is not duplicated. Such assurance may be obtained by the following exemplary method. The initial stamp is the current date and Q=0. This is encrypted by the symmetric key K. An alternate exemplary embodiment of the present invention may use any combination of the variables Q and/or date. Furthermore S2 may not be encrypted.

The two stamps S1 and S2 are sent at step 441 to the stamping UI module 139 (FIG. 1). The stamps S1 and S2 are written at step 442 to the storage device 140. The stamp can be located in any place in the storage device, such as but not limited to, a regular file, a hidden file, or an unformatted section in the storage device.

Figure 5A:
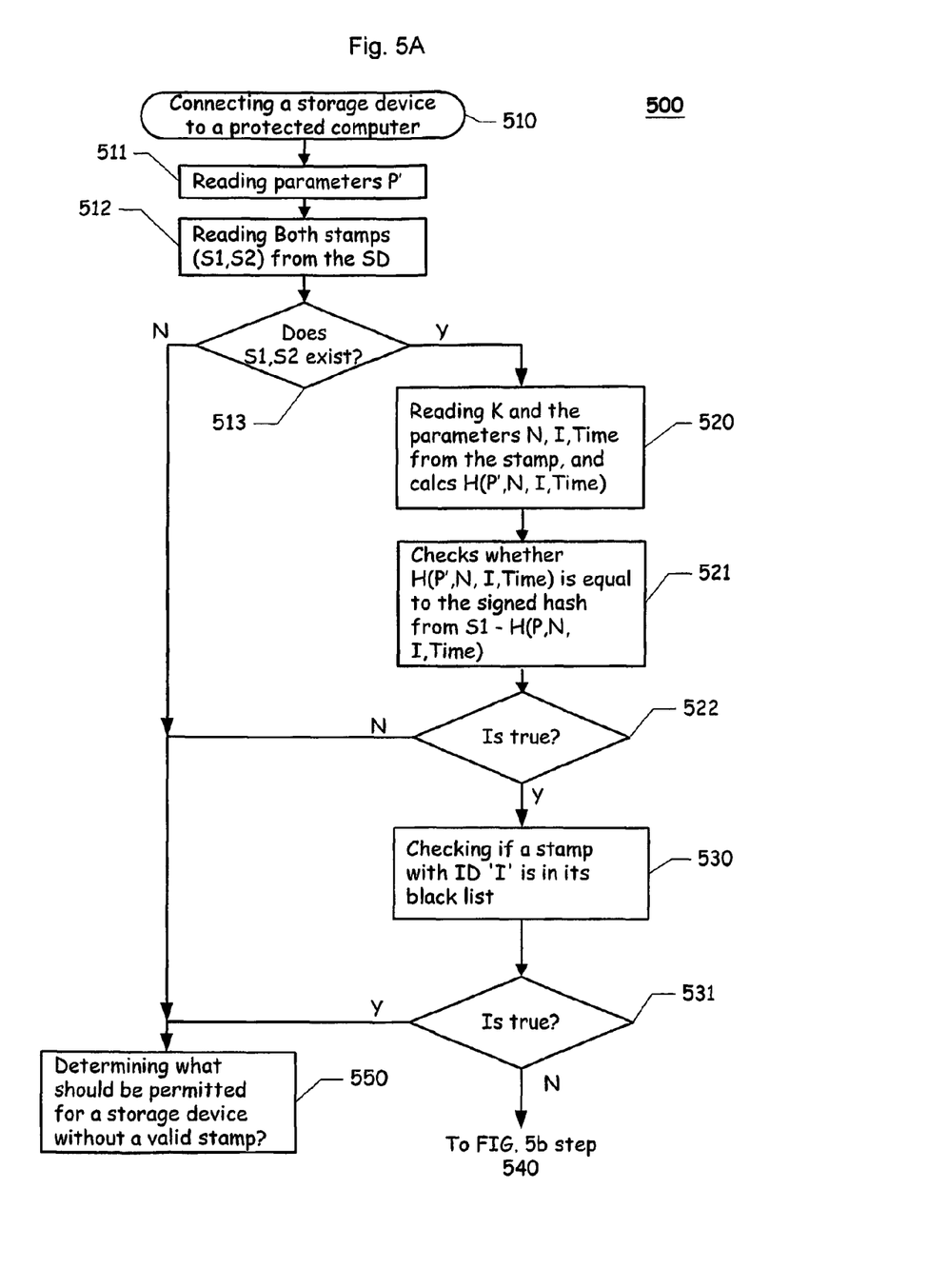
FIG. 5a & b illustrate a flowchart with relevant steps of an exemplary method for determining which of the functionalities of a storage device that has been entered to a client computing device may be allowed.
Figure 5B:
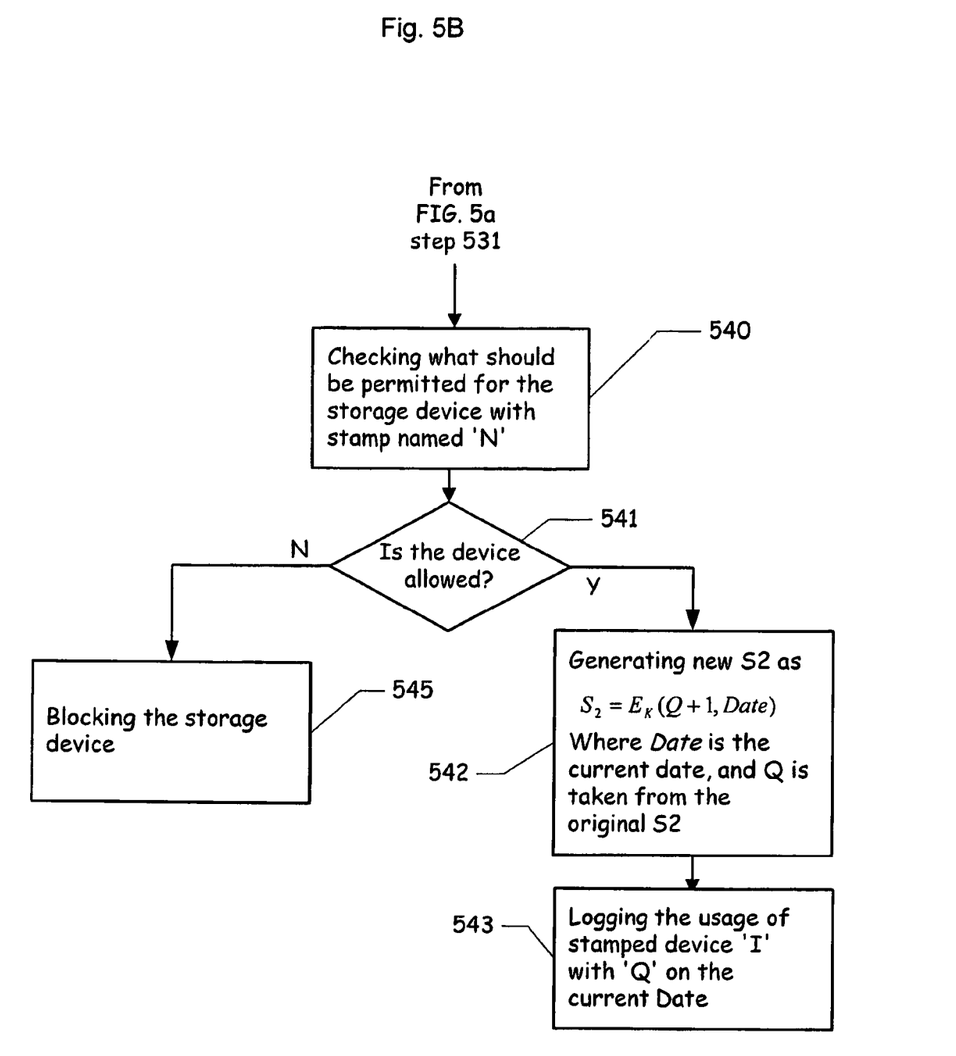

FIGS. 5A and 5B illustrate a flowchart depicting relevant steps of an exemplary method 500. The method 500 may be used in the client's security agent 230 (FIG. 2) to validate the stamps and enforce a security policy accordingly. Method 500 may check whether there are valid stamps on the current storage device. If valid stamps exist, the method checks their names (security ascription N); and updates the changeable part of the signature S2. Based on the signature and the security ascription N the appropriate security policy is retrieved and enforced by the security agent 230. If a signature is not found the device may be denied.

Upon connecting a storage device at step 510, which might be a legal or illegal action, the PGM 310 (FIG. 3) may gather at step 511 appropriate parameters, if accessible, from the storage device. The parameters can be the same parameters that were gathered at step 414 (FIG. 4). These parameters are identified as P'. At step 512, the PGM 310 reads the pair of stamps (S1 and S2) from the storage device. The stamp pair can be one from many stamp pairs located on the storage device. This method should apply to every stamp separately. If at step 513 there are no stamps gathered by the PGM 310, the storage device has no valid stamps and method 500 may proceed to step 550 to determine what actions with the device can be allowed (according to certain security policies, certain devices may be fully or partially allowed, e.g., in a read only state or a default security policy could be applied). If at step 513 there is one or more pairs of signatures, for each one of the pairs of signatures, method 500 may perform the rest of the steps (520 to 540 in FIG. 5b).

At step 520 and step 521, the value of K may be obtained from the appropriate part of the unchangeable signature (S1) using the shared, predefined symmetric key. Exemplary authentication of the signatures may be done by a cryptographic hash of the parameters gathered from the storage device P', the stamp name—N, the unique ID of the stamp—I and the Time the stamp was created—Time. This generates H(P',N,I,Time). The stamp, after being decrypted with the server's public key is H(P,N,I,Time). If 522 those hash values are equal, which means that the storage device has the same parameters, then the unchangeable stamp is authentic and method 500 proceeds to step 530 to check the black list. However, if at step 522 these two values are not equal, the method 500 proceeds to step 550.

At step 530, the bank of security policies (BOPS) 340 is searched for a black list. The black list is a list of all the stamp IDs that are forged (this means, the stamps that were caught being used in a fake storage device) or otherwise declared invalid or suspicious. The algorithm for building this black list is discussed below in conjunction with FIG. 6. A decision is made at step 531 as to whether the stamp is in the black list. If at decision block 531 it is determined that the stamp is in the black list, the method 500 proceeds to step 550.

If at decision block 531 it is determined that the stamp is not in the black list, the BOPS 540 is searched for an appropriate security policy. The appropriate security policy may fit the security ascription (stamp named N) in the storage device. At step 540, searching for a security policy may be performed after all pairs of the stamps, which exist in the storage device, have been checked, and the BOPS gets a list of stamp names and IDs of valid stamps. Based on the appropriate security policy, a decision is made at decision block 541 whether the device is allowed and what restrictions should be applied. If at decision block 541 it is determined that the device is allowed, then the algorithm continues at step 542. However, if the device is not allowed, the algorithm continues at step 545.

At step 542, the sequence number Q is incremented from the value it had on the previous stamp. The date is written as the current date and the changeable stamp is calculated and rewritten over the old one. A log is made at step 543 and then stored. Later, the log will be sent to the security server.

At step 545, the storage device has been declared as not allowed and as such, the operations with the storage device may be limited or completely shut down. In some embodiments, limited operations may be permitted to be performed on the storage device. For example, the read only mode may be allowed. A log may be created and stored, and later, the log will be sent to the server.

At step 550 (FIG. 5a) the client security agent 230 may decide that there is no valid stamp on the storage device 140. Therefore, a security policy that may be associated in such a case may be retrieved from the BOPS 340 (FIG. 3). Based on the security policy, a decision is made how to handle the storage device. An exemplary embodiment of the present invention may block the device, other exemplary policies may allow read only operations, alerting the administrator, etc.

Figure 6:
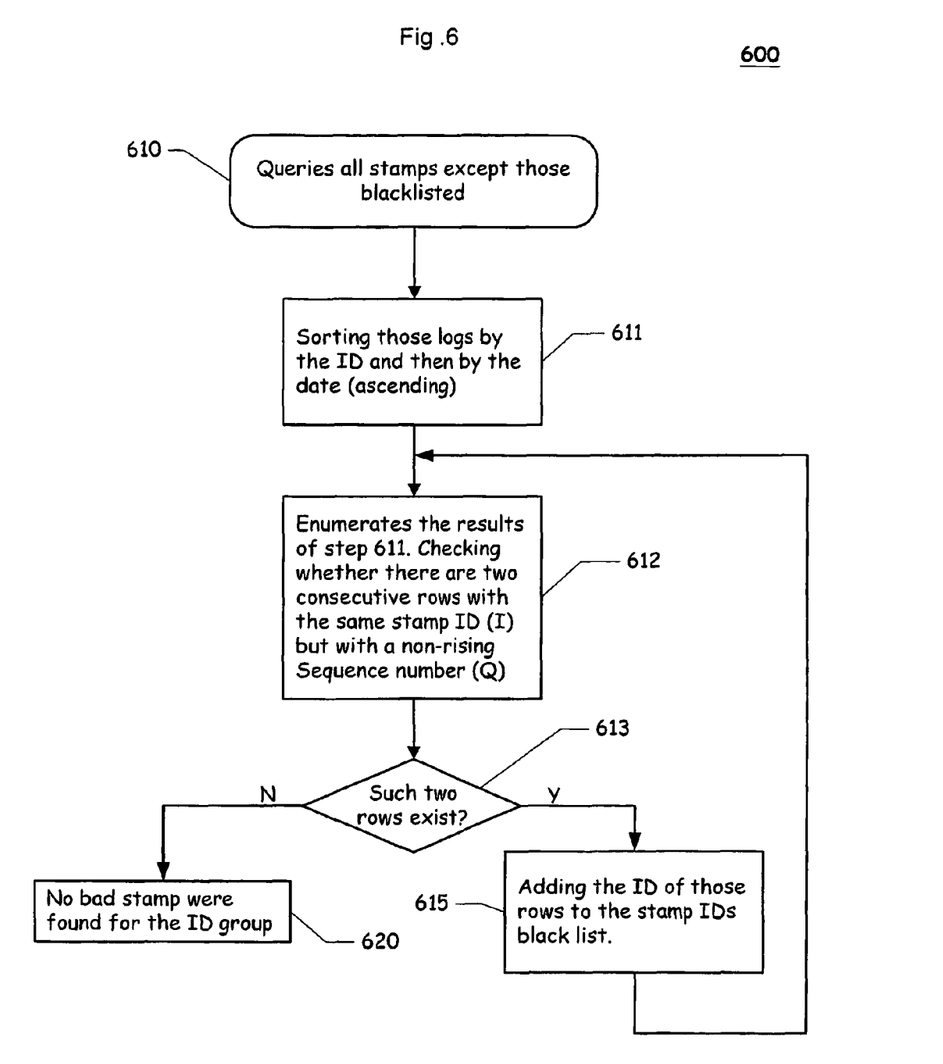
FIG. 6 illustrates a flowchart with relevant steps of an exemplary method for determining which signatures signed on storage devices were forged.

FIG. 6 illustrates a flowchart depicting relevant steps of an exemplary method 600. The method 600 may be used by the LA 133 (FIG. 1) for adding forged stamps, or otherwise invalid or suspicious stamps, to the stamps black list. Exemplary method 600 may identify copied stamps. One can copy a stamp from an authorized storage device 140, to an unauthorized device that has the exact same hardware properties.

The method 600 may be initiated at step 610 from time to time. Upon initiation, the log analyzer 133 (FIG. 1) may request all the logs that were created by the client security agents. The logs may be created by method 500 (FIG. 5) during step 543. The request may be sent to the log server module 134 (FIG. 1), which stores and manages the logging of the client security agents. Each log may have properties like but not limited to: I—the stamp ID that is given to the stamp in step 421; a sequence number—Q; and Date—The date that this sequence number was introduced.

At step 611 the data taken in step 610 is being sorted primarily by the IDs and secondarily by the date. The logs are sorted in this way so that the analyzer will be able to enumerate them one by one and find two consecutive lines with a non-rising sequence number Q. Such a condition indicates either that a high sequence number was used before a low one, or that a sequence number was used twice. If this condition occurs, it can be concluded that the stamp was copied because otherwise, the sequences increment sequentially. At steps 612-613 the process operates to check each stamp ID group to determine if there are two lines with a non-rising sequence number. If such a situation exists, processing continues at step 615 to black list the stamp and method 600 returns to step 612 for the next ID group. The method then continues at step 612 from the point it stopped during previous iterations, and does not check all the IDs it checked before.

If at step 613 it is determined that no two such rows exist 620, then it can be concluded that all the stamp ID groups under test were validated and the forged ones were black-listed. At this point, then method 600 ends.

In an alternate embodiment of the present invention method 600 may be slightly modified. The logs are sorted 611 to groups according to their stamp ID. Each ID group is sorted according to the sequence number—Q. Then analyzer 133 (FIG. 1) may search at step 612 for one or more stamp IDs that were used more then once with the same sequence. In addition, a search may be done to find an older sequence number that was used after a newer sequence number. A Stamp ID that has two or more instances of the same sequential number Q, or has conflict between the sequence numbers and the dates may be forged, invalid or copied. If at step 613 such a corrupted ID stamp exists, then the ID of those stamps may be added at step 615 to the black list, which will be deployed to all clients' and be stored in the BOPS 340. At this point, the method 600 returns to step 612 for the next ID group. If the logs, of all ID groups, were all read and no irregularities were found, then this algorithm ends.

In this application, the words "unit", "task", and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, each of the verbs, "comprise", "include", "have", and conjugates thereof, are used to indicate that the object or objects of the verb are not necessarily a complete listing of members, components, elements or parts of the subject or subjects of the verb.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The described embodiments comprise different features, not all of which are required in all embodiments of the invention. Some embodiments of the present invention utilize only some of the features or possible combinations of the features. Different combinations of features noted in the described embodiments will occur to persons skilled in the art. The scope of the invention is limited only by the following claims.

What is claimed is:

1. A method for securely controlling access to a device that is capable of storing data, the method comprising:
    obtaining, by a computing device, information related to the device, the information including at least:
        parameters P associated with the device,
        a time variable Time,
        a name N representing an ascription, and
        a unique identification value I;
    encrypting by a computing device, a function of the P, N, I and Time values with a symmetric key K to generate a first portion of an unchangeable signature S1;
    encrypting, by a computing device, the symmetric key K with a shared key to generate a second portion of signature S1;
    combining, by a computing device, the first and second portions along with the value of N, I and Time into a unique identification parameter and storing the identification parameter on the device;
controlling, by a computing device, access to the device by:
extracting identification information from the device,
checking the validity of the digital certificate of the device; and
applying a security policy that is based at least in part on the unique identification.

2. The method of claim 1, comprising uniquely identifying the device utilizing a unique digital certificate.

3. The method of claim 2, wherein the step of uniquely identifying the device is performed within a network setting.

4. The method of claim 1, wherein the device is associated with a client device that includes a client agent, and the client device is associated with a server running a security manager module, and wherein controlling access to the device comprises the client agent extracting identification information from the device and providing the identifying information to the security manager module.

5. The method of claim 1, wherein the step of applying the security policy comprises performing one or more of the following actions:
blocking access to the device;
enabling access to the device;
disabling all writing operations to the device; and
logging that the device was introduced to the client agent.

6. The method of claim 1, further comprising generating a second signature S2.

7. The method of claim 6, wherein generating a second signature S2 comprises the steps of:
obtaining a sequence number Q;
obtaining a date D; and
encrypting the values of Q and D using the symmetric key K to obtain the signature S2.

8. The method of claim 3, further comprising: sending a log to a server, said log including information on a usage of the device.

9. The method of claim 8, wherein the information on the usage of the device includes at least one parameter selected from the group consisting of date and time of usage, the identification value I, and a sequence number Q.

10. The method of claim 8, wherein the server is adapted to analyze the information on the usage of the device and determine whether the device is a forged device.

11. The method of claim 4, wherein the step of providing at least a portion of a value related to or derived from the digital certificate to the security manager module comprises the steps of:
decrypting the second portion of the signature S1 to obtain the symmetric key K;
decrypting the first portion of the signature S1 with the symmetric key K to obtain a first value function of the P, N, I, and Time values;
extracting parameters P' from the device;
generating a value represented by a second value function of P', N, I, and Time;
if the first value function and the second value function are equivalent, applying an appropriate security policy.

12. The method of claim 11, wherein if the first value function and the second value function are not equivalent, applying a default security policy.

13. The method of claim 7, further comprising the step of updating the value of S2 upon accessing the device.

14. The method of claim 1, further comprising the step of maintaining a log of usage of the device.

15. A system for securely controlling access to memory storage devices existing or introduced into a network setting, the system comprising:
a server housing a security manager module;
a plurality of client devices coupled to the server through a network;
wherein the security manager module is operable to:
obtain parameters P associated with a device;
obtain a name N representing an ascription;
obtain a unique identification value I;
obtain a time variable Time,
encrypt a function of the P, N, I and Time values with a symmetric key K to generate a first portion of an unchangeable signature S1;
encrypt the symmetric key K with a shared key to generate a second portion of a signature S1;
combine the first and second portions along with the value of N, I and Time into a unique identification parameter and store the unique identification parameter on the device; and
control access to the each of the plurality of client devices contingent at least in part upon said client device being associated with a client agent; and, wherein said client agent is operable to:
extract information from the memory storage device,
validate the identification information that uniquely identifies the memory storage device, and
apply a security policy related to accessing the storage device based at least in part on the identification parameter.

16. The system of claim 15, wherein the client agent is operable to:
detect a memory storage device communicatively coupled to the client device.

17. The system of claim 16, wherein the client agent is further operable to provide the information to the security manager module.

18. The system of claim 16, wherein the security policy can be used to determine one or more actions selected from the group consisting of:
blocking access to the memory storage device;
enabling access to the memory storage device;
disabling all writing operations to the memory storage device; and
logging that the specific memory storage device was introduced to the client agent.

19. The system of claim 15, wherein the security policy can be used to perform one or more actions comprising the actions of:
blocking access to the memory storage device;
enabling access to the memory storage device;
disabling all writing operations to the memory storage device; and
logging that the specific memory storage device was introduced to the client agent.

20. The system of claim 19, wherein the client agent is software embedded within the client device.

21. The system of claim 19, wherein the client agent is hardware embedded within the client device.

22. The system of claim 15, wherein the server includes a stamping module, the stamping module being operable to:
detect the connection of the memory storage device to the server;
obtain one or more parameters from the storage device;
generate a digital certificate based at least in part on the one or more parameters; and store the digital certificate within the memory storage device.

23. The system of claim 22, wherein the stamping module is further operable to receive additional data and is operable to generate the digital certificate based at least in part on the additional data.

24. A method for protecting transferring of data between one or more client computers and one or more external devices, wherein the one or more client computers are clients of a private network that includes a security server, the method comprising the steps of:
  obtaining parameters P associated with an external device;
  obtaining a name N representing an ascription;
  obtaining a unique identification value I;
  obtaining a time variable Time,
  encrypting a function of the P, N, I and Time values with a symmetric key K to generate a first portion of an unchangeable signature;
  encrypting the symmetric key K with a shared key to generate a second portion of a signature;
  combining the first and second portions along with the value of N, I and Time into a digital certificate and storing the digital certificate on the external device;
  connecting the external device to one of the one or more client computers;
  searching for a digital certificate that was previously written on the external device and was generated by the security server; if the digital certificate was not found, then limiting the transfer of data to or from the external device;
  processing the digital certificate and determining what type of data transferring is allowed between the external device and the client computer; and
  controlling the data transfer according to the processed decision.

25. A method of controlling access to storage devices the method comprising:
  obtaining, by a computing device, information related to a storage device, the information including at least:
    parameters P associated with an external device,
    a name N representing an ascription, and
    obtaining a unique identification value I;
    a time variable Time,
  encrypting, by a computing device, a function a function of the P, N, I and Time values with a symmetric key K to generate a first portion of an unchangeable signature;
  encrypting, by a computing device, the symmetric key K with a shared key to generate a second portion of the signature;
  combining, by a computing device, the first and second portions along with the value of N, I and Time into a unique identifier and storing the unique identifier on the storage device;
  extracting identification information from the storage device;
  validating the identification information; and
  determining, by a computing device, a level of access to the storage device based on a security policy, said security policy based at least in part on a unique identifier extracted from said storage device.

26. The method of claim 25, wherein said unique identifier is stored on said storage device by a security server.

27. The method of claim 26, wherein said security policy is provided to by said security server to a client agent.

28. The method of claim 27, wherein said step of determining a level of access based on said security policy is performed by said client agent.

29. The method of claim 25, wherein determining access comprises enabling or blocking access to said storage device.

30. The method of claim 25, wherein determining access comprises performing an action selected from the list consisting of:
  blocking access to the storage device;
  enabling access to the storage device; and
  disabling all writing operations to the storage device.

31. The method of claim 30, further comprising logging the access to the storage device by the client agent.

* * * * *